United States Patent
Cha et al.

(10) Patent No.: US 10,983,261 B2
(45) Date of Patent: Apr. 20, 2021

(54) PANEL DEVICE AND DISPLAY DEVICE

(71) Applicant: SAMSUNG ELECTRONICS CO., LTD., Suwon-si (KR)

(72) Inventors: Kyung Hoon Cha, Seoul (KR); Sergey Shestak, Seoul (KR); Farid Mukhtarov, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/467,168

(22) PCT Filed: Aug. 30, 2017

(86) PCT No.: PCT/KR2017/009465
§ 371 (c)(1),
(2) Date: Jun. 6, 2019

(87) PCT Pub. No.: WO2018/105859
PCT Pub. Date: Jun. 14, 2018

(65) Prior Publication Data
US 2020/0073037 A1 Mar. 5, 2020

(30) Foreign Application Priority Data
Dec. 6, 2016 (KR) .......................... 10-2016-0165079

(51) Int. Cl.
*G02B 5/30* (2006.01)
*G02B 30/25* (2020.01)
*G02B 5/02* (2006.01)

(52) U.S. Cl.
CPC ............. *G02B 5/3041* (2013.01); *G02B 5/02* (2013.01); *G02B 5/3016* (2013.01); *G02B 30/25* (2020.01)

(58) Field of Classification Search
CPC ...... G02B 5/3016; G02B 30/25; G02B 30/26; G02B 30/34; G02B 5/30; G02B 27/28;
(Continued)

(56) References Cited
U.S. PATENT DOCUMENTS
7,898,568 B2  3/2011  Kim
8,872,987 B2  10/2014 Son
(Continued)

FOREIGN PATENT DOCUMENTS
KR  10-2008-0024668 A  3/2008
KR  10-2012-0026786 A  3/2012
(Continued)

OTHER PUBLICATIONS
International Search Report dated Dec. 27, 2017 by the International Searching Authority in counterpart International Patent Application No. PCT/KR2017/009465.
(Continued)

*Primary Examiner* — Michael H Caley
*Assistant Examiner* — Mariam Qureshi
(74) *Attorney, Agent, or Firm* — Sughrue Mion, PLLC

(57) ABSTRACT

A panel device according to various embodiments of the disclosure includes a display panel including a plurality of pixels and a polarization panel including a first polarization pattern and a second polarization pattern and disposed on the display panel to allow a boundary line between the first polarization pattern and the second polarization pattern to divide each of the pixels into a first area corresponding to the first polarization pattern and a second area corresponding to the second polarization pattern.

11 Claims, 12 Drawing Sheets

(58) Field of Classification Search
CPC ........ G02F 1/133602; G02F 1/133528; H04N 13/00
See application file for complete search history.

(56) References Cited

U.S. PATENT DOCUMENTS

| | | | |
|---|---|---|---|
| 2007/0165304 A1* | 7/2007 | Tomita ................. | H04N 19/597 359/464 |
| 2008/0123173 A1* | 5/2008 | Kim ...................... | G02B 30/25 359/246 |
| 2008/0170183 A1* | 7/2008 | Sugiyama ............. | H04N 13/31 349/96 |
| 2012/0169949 A1 | 7/2012 | Son | |
| 2012/0169979 A1* | 7/2012 | Cheng .................... | G02B 30/26 349/123 |
| 2014/0085352 A1* | 3/2014 | Langendijk .......... | H04N 13/337 345/690 |
| 2015/0268546 A1* | 9/2015 | Huang ................... | G02B 30/26 349/5 |
| 2016/0240118 A1* | 8/2016 | Ray ........................ | G09G 3/003 |
| 2018/0136519 A1* | 5/2018 | Yata ................... | G02F 1/133606 |

FOREIGN PATENT DOCUMENTS

| | | |
|---|---|---|
| KR | 10-2012-0077071 A | 7/2012 |
| KR | 10-2012-0122606 A | 11/2012 |
| KR | 10-2016-0076050 A | 6/2016 |

OTHER PUBLICATIONS

Written Opinion dated Dec. 27, 2017 by the International Searching Authority in counterpart International Patent Application No. PCT/KR2017/009465.

* cited by examiner

PANEL DEVICE AND DISPLAY DEVICE

TECHNICAL FIELD

Various embodiments disclosed in the disclosure relate to a panel device and a display device, which are capable of displaying an image.

BACKGROUND ART

With the development of digital technology, a variety of types of electronic products have been developed and popularized, and most electronic devices that are recently developed include displays.

Various type of displays, such as a plasma display panel (PDP), a liquid crystal display (LCD), and a light emitting diode (LED) display, have been commercialized. In recent years, the LED display is becoming widespread since it has advantages such as low power consumption and fast response speed.

DISCLOSURE

Technical Problem

In general, the LED display is manufactured by bonding LED chips on a printed circuit board (PCB) at a predetermined interval. A large-sized display such as an electric sign board is manufactured using the LED display, and a size of the large-sized display increases by widening the interval between the LED chips. Manufacturers of the LED display are in a trend to cut a cost by reducing a size of the LED chips. When the interval between the LED chips increases or the size of the LED chips decreases, an area for the PCB increases, and as a result, an image quality at a short distance is degraded. When the number of the LED chips increases, the area for the PCB is reduced and the resolution of the LED display increases, however, a manufacturing cost increases as the number of the LED chips increases.

Various embodiments disclosed in the disclosure provide a panel device and a display device, which are capable of improving an image quality by reducing an area occupied by the area for the PCB in a conventional LED display and increasing the resolution while maintaining the number of the LED chips.

Technical Solution

A panel device according to various embodiments of the disclosure includes a display panel including a plurality of pixels and a polarization panel including a first polarization pattern and a second polarization pattern and disposed on the display panel to allow a boundary line between the first polarization pattern and the second polarization pattern to divide each of the pixels into a first area corresponding to the first polarization pattern and a second area corresponding to the second polarization pattern.

A display device according to various embodiments of the disclosure includes a display and a processor that displays an image through the display. The display includes a display panel including a plurality of pixels and a polarization panel including a first polarization pattern and a second polarization pattern and disposed on the display panel to allow a boundary line between the first polarization pattern and the second polarization pattern to divide each of the pixels into a first area and a second area.

Other aspects, advantages, and salient features of the disclosure will become apparent to those skilled in the art from the following detailed description, which, taken in conjunction with the annexed drawings, discloses various embodiments of the disclosure.

Advantageous Effects

According to various embodiments of the disclosure, a resolution that is perceived by a user may be improved without increasing the number of the LED chips.

MODE FOR INVENTION

Hereinafter, certain embodiments of the disclosure may be described with reference to accompanying drawings. Accordingly, those of ordinary skill in the art will recognize that modifications, equivalents, and/or alternatives on the various embodiments described herein may be made without departing from the scope and spirit of the disclosure. Throughout the drawings, it should be noted that like reference numbers are used to depict the same or similar elements, features, and structures.

Figure 1:
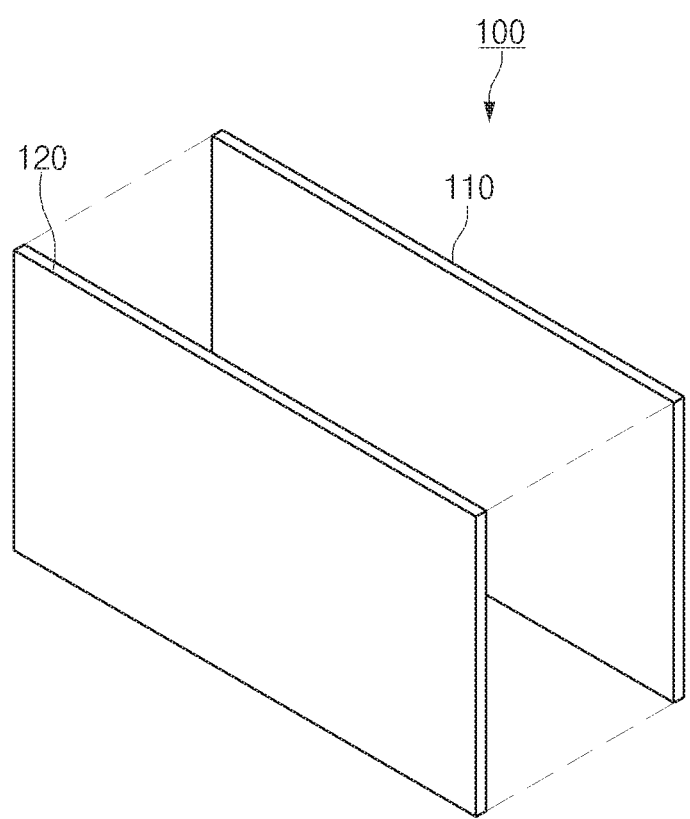
FIG. 1 is a block diagram illustrating a structure of a panel device according to various embodiments of the disclosure.

FIG. 1 is a block diagram illustrating a structure of a panel device according to various embodiments of the disclosure.

Referring to FIG. 1, the panel device 100 may include a display panel 110 and a polarization film 120.

According to an embodiment, the display panel 110 may display an image (e.g., a video image). For example, the display panel 110 may display a two-dimensional or three-dimensional image using a light emitted from a light source.

According to an embodiment, the polarization panel 120 may be disposed above the display panel 110. According to an embodiment, the polarization panel 120 may include a plurality of patterns. As an example, the polarization panel 120 may include a first polarization pattern and a second polarization pattern, which are alternately arranged in a line unit. As another example, the polarization panel 120 may include a first polarization pattern and a second polarization pattern, which are arranged in a checkerboard pattern.

Figure 2A:
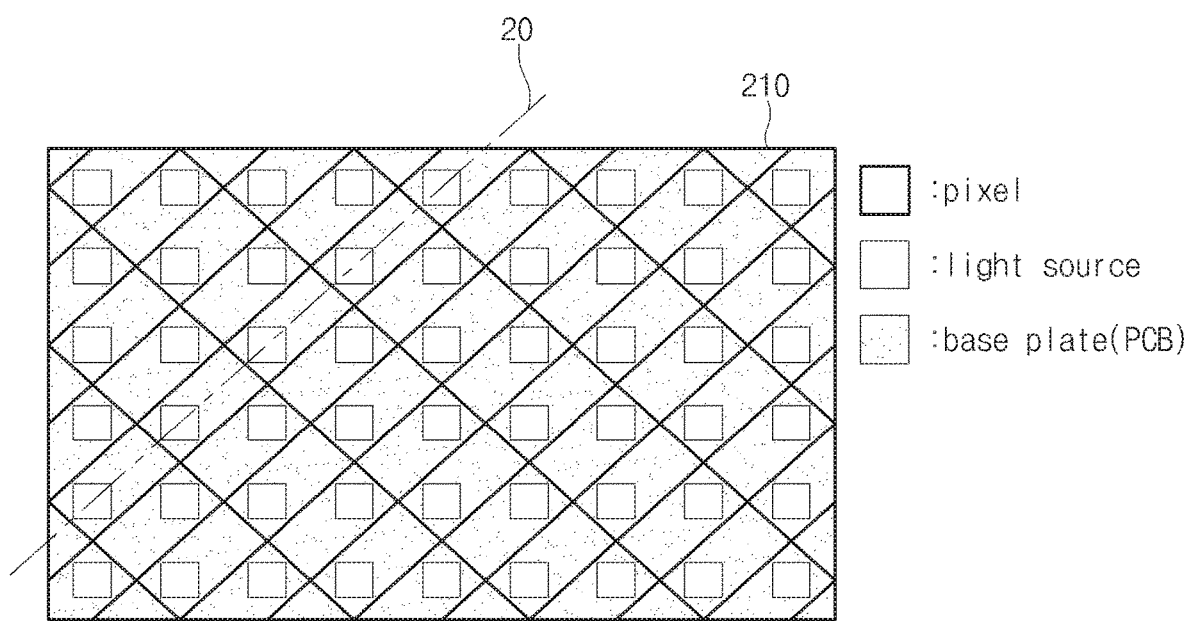
FIGS. 2A and 2B are views illustrating a structure of a display panel according to various embodiments of the disclosure.
Figure 2B:
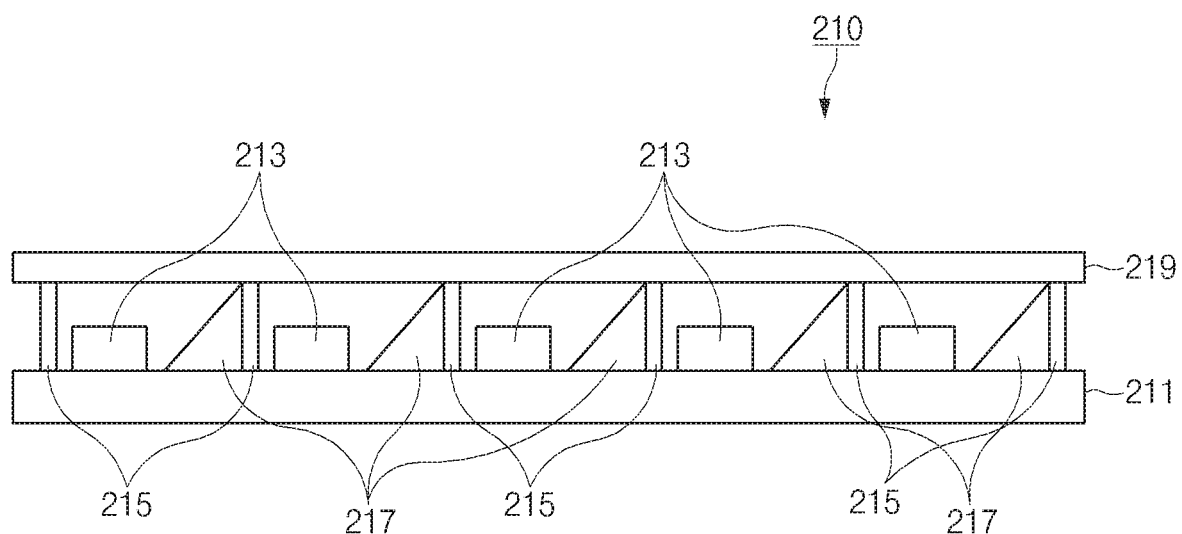

FIGS. 2A and 2B are views illustrating a structure of a display panel according to various embodiments of the disclosure.

Referring to FIG. 2A, a display panel 210 (e.g., the display panel 110 of FIG. 1) may include a plurality of light sources arranged on a base plate. According to an embodiment, the light sources may be arranged on the base plate at predetermined regular intervals. As an example, the light sources may be arranged in a matrix form at the same horizontal and vertical intervals.

According to an embodiment, the display panel 210 may include a plurality of pixels. According to an embodiment, each of the light sources may be included in the pixels after being spatially separated from each other. According to an embodiment, each of the pixels may have the same shape as each other. For example, each of the pixels may have a rectangular shape. According to an embodiment, the pixels may be arranged in a direction different from a direction in which the light sources are arranged. As an example, referring to FIG. 2A, when the light sources are arranged substantially in parallel to a horizontal or vertical direction of the display panel 210, the pixels may be arranged in an oblique direction of the display panel 210.

FIG. 2B shows an example of a cross section taken along a line 20 crossing the display panel 210 shown in FIG. 2A. Referring to FIG. 2B, the display panel 210 may include the base plate 211, the light sources 213, a barrier 215, a plurality of reflection plates 217, and a diffuser 219.

According to an embodiment, the base plate 211 may include a printed circuit board (PCB). According to an embodiment, the base plate 211 may fix the light sources 213 and may electrically connect the light sources 213 to another component (e.g., a processor).

According to an embodiment, the light sources 213 may be disposed on the base plate 211. According to an embodiment, each of the light sources 213 may be disposed in a first area or a second area of the pixel. As an example, some light sources of the light sources 213 may be disposed in the first area, and the other light sources of the light sources 213 may be disposed in the second area. The first area may be an area corresponding to a first polarization pattern of a polarization panel (e.g., a polarization panel 420 of FIG. 4A). The second area may be an area corresponding to a second polarization pattern of the polarization panel.

According to an embodiment, the light sources 213 may include at least one light emitting diode (LED). For instance, the light sources 213 may include red, green, and blue LEDs. According to an embodiment, the light sources 213 may emit the light to display the image through the display panel 210. As an example, the light sources 213 may display a first image and a second image. According to an embodiment, the first image may be an image corresponding to some pixels of the pixels included in one image frame, and the second image may be an image corresponding to the other pixels of the pixels included in the one image frame. That is, the light sources 213 may divide the one image frame into the first image and the second image and may display the first image and the second image at different times, respectively. According to another embodiment, the first image may be a left eye image of the three-dimensional image, and the second image may be a right eye image of the three-dimensional image.

According to an embodiment, the barrier 215 may spatially separate the light sources 213 from each other to form the pixels. According to an embodiment, the barrier 215 may be disposed on the base plate 211 in a direction perpendicular to the base plate 211.

According to an embodiment, the reflection plates 217 may be disposed in the pixels. According to an embodiment, each of the reflection plates 217 may be disposed in an area different from the light sources 213 in the pixels. As an example, when the light source is disposed in the first area, the reflection plate 217 may be disposed in the second area. As another example, when the light source is disposed in the second area, the reflection plate may be disposed in the first area. According to an embodiment, the reflection plates 217 may reflect the light emitted from the light sources 213 to the outside and may increase an amount of the light emitted to the outside of the pixel.

According to an embodiment, the diffuser 219 may be disposed on the barrier 215 to be substantially parallel to the base plate 211. According to an embodiment, the diffuser 219 may diffuse the light emitted from the light sources 213. For example, the light emitted from the light sources 213 may be diffused by the diffuser 219 to the entire pixels in which the light sources 213 are respectively included.

According to an embodiment, some components of the components shown in FIG. 2B may be omitted. For example, at least one of the reflection plate 217 or the diffuser 219 may be omitted.

Figure 3A:
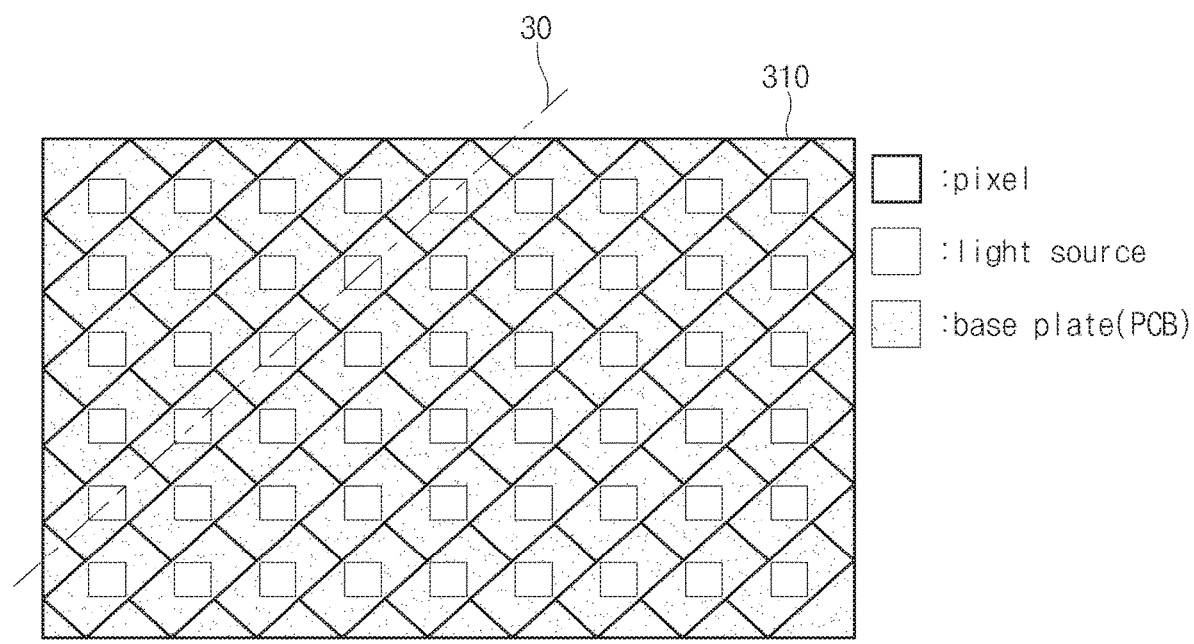
FIGS. 3A and 3B are views illustrating a structure of a display panel according to various embodiments of the disclosure.
Figure 3B:
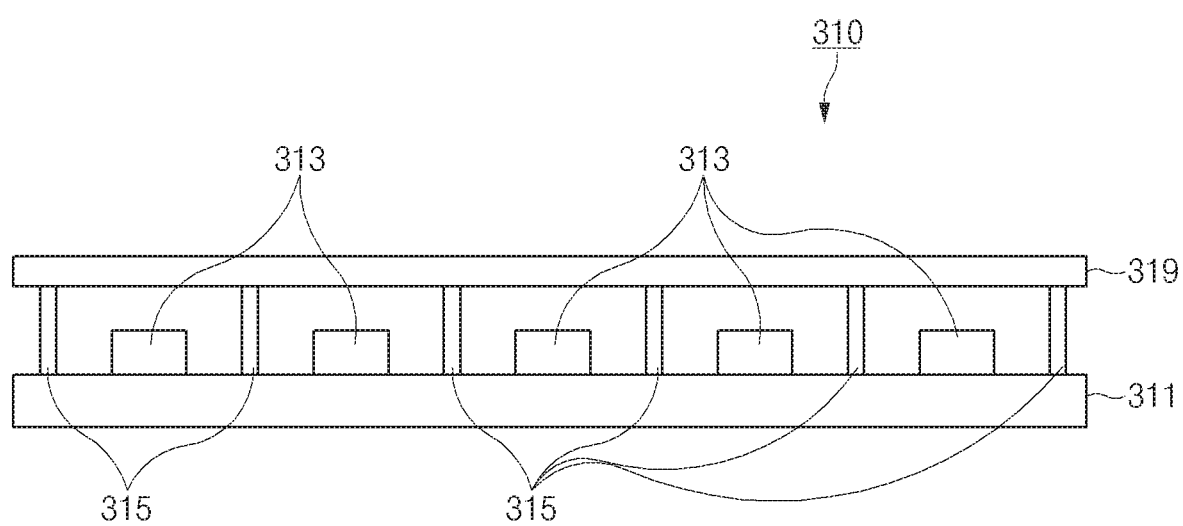

FIGS. 3A and 3B are views illustrating a structure of a display panel according to various embodiments of the disclosure.

Referring to FIG. 3A, a display panel 310 (e.g., the display panel 110 of FIG. 1) may include a plurality of light sources disposed on a base plate. According to an embodiment, the light sources may be arranged on the base plate at predetermined regular intervals. As an example, the light sources may be arranged in a matrix form at the same horizontal and vertical intervals.

According to an embodiment, the display panel 310 may include a plurality of pixels. According to an embodiment, the light sources may be respectively included in the pixels to be spatially separated from each other. According to an embodiment, the pixels may have the same shape as each other. For example, each of the pixels may have a rectangular shape. According to an embodiment, the pixels may be arranged in a direction different from a direction in which the light sources are arranged. As an example, referring to FIG. 3A, when the light sources are arranged substantially in parallel to a horizontal or vertical direction of the display panel 310, the pixels may be arranged in an oblique direction of the display panel 310.

FIG. 3B shows an example of a cross section taken along a line 30 crossing the display panel 310 shown in FIG. 3A. Referring to FIG. 3B, the display panel 310 may include the base plate 311, the light sources 313, a barrier 315, and a diffuser 319.

According to an embodiment, the base plate 311 may include a printed circuit board (PCB). According to an embodiment, the base plate 311 may fix the light sources 313 and may electrically connect the light sources 313 to another component (e.g., a processor).

According to an embodiment, the light sources 313 may be disposed on the base plate 311. According to an embodiment, each of the light sources 313 may be disposed over a first area or a second area (for example, a center area of the pixel).

According to an embodiment, the light sources 313 may include at least one light emitting diode (LED). For instance, the light sources 213 may include red, green, and blue LEDs. According to an embodiment, the light sources 313 may emit the light to display the image through the display panel 310. As an example, the light sources 313 may display a first image and a second image. According to an embodiment, the first image may be, for example, an image corresponding to some pixels of the pixels included in one image frame, and the second image may be, for example, an image corresponding to the other pixels of the pixels included in the one image frame. That is, the light sources 313 may divide the one image frame into the first image and the second image and may display the first image and the second image at different times, respectively.

According to an embodiment, the barrier 315 may spatially separate the light sources 213 from each other to form the pixels. According to an embodiment, the barrier 315 may be disposed on the base plate 311 in a direction perpendicular to the base plate 311.

According to an embodiment, the diffuser 319 may be disposed on the barrier 315 to be substantially parallel to the base plate 311. According to an embodiment, the diffuser 319 may diffuse the light emitted from the light sources 313. For example, the light emitted from the light sources 313 may be diffused by the diffuser 319 to the entire pixels in which the light sources 313 are respectively included. According to an embodiment, the diffuser 319 among the components shown in FIG. 3B may be omitted.

Figure 4A:
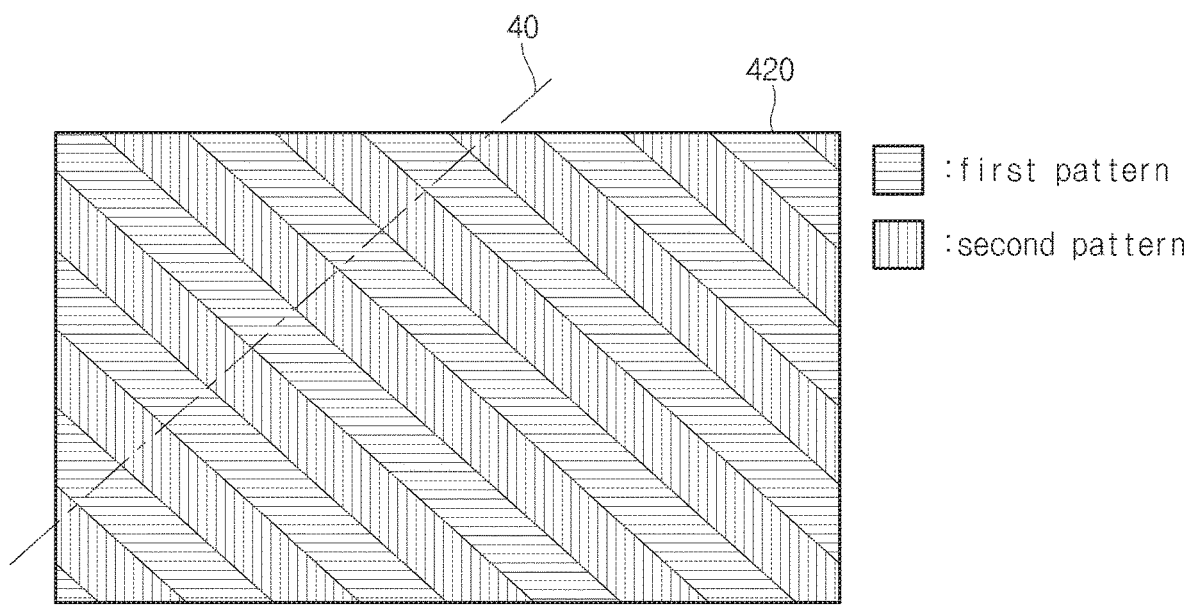
FIGS. 4A to 4C are views illustrating a structure of a polarization panel according to various embodiments of the disclosure.
Figure 4B:
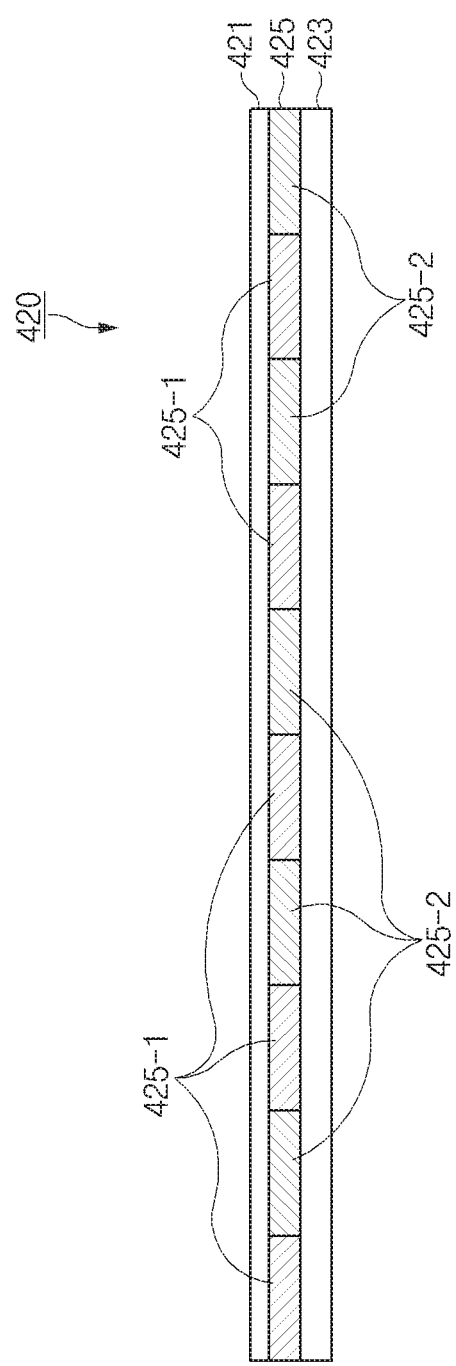
Figure 4C:
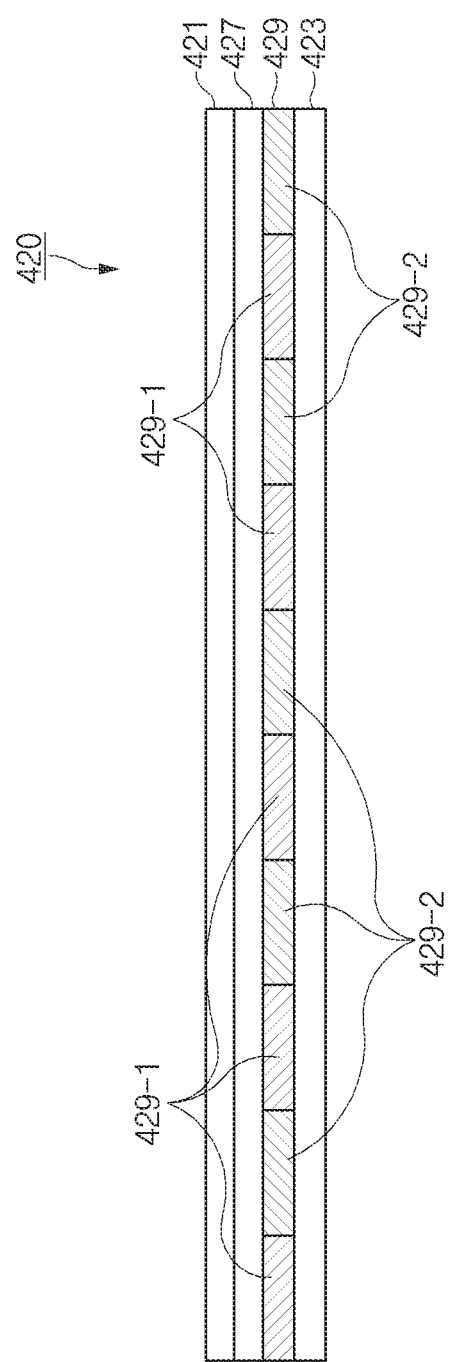

FIGS. 4A to 4C are views illustrating a structure of a polarization panel according to various embodiments of the disclosure.

Referring to FIG. 4A, a polarization panel 420 (e.g., the polarization panel 120 of FIG. 1) may include a plurality of patterns. As an example, the polarization panel 420 may include a first polarization pattern and a second polarization pattern. According to an embodiment, the first polarization pattern and the second polarization pattern may be alternately arranged with each other in a line unit. When the first polarization pattern and the second polarization pattern are arranged in the line unit, the first polarization pattern and the second polarization pattern may be arranged in an oblique direction with respect to the polarization panel 420. According to another embodiment, the first polarization pattern and the second polarization pattern may be alternately arranged with each other in a checkerboard pattern.

According to an embodiment, the first polarization pattern may transmit a first image and may block a second image of the image displayed through the display panel (e.g., the display panel 110 of FIG. 1). According to an embodiment, the second polarization pattern may transmit the second image and may block the first image of the image displayed through the display panel.

FIG. 4B shows an example of a cross section taken along a line 40 crossing the polarization panel 410 shown in FIG. 4A. Referring to FIG. 4B, the polarization panel 420 may include a first polarization film 421, a second polarization film 423, and a liquid crystal layer 425.

According to an embodiment, the first polarization film 421 and the second polarization film 423 may have the same or different polarization states. For example, the first polarization film 421 and the second polarization film 423 may transmit a light in a first polarization (e.g., about 90° linear polarization) state. As another example, the first polarization film 421 may transmit the light in the first polarization state and the second polarization film 423 may transmit a light in a second polarization (e.g., about 180° linear polarization) state.

According to an embodiment, the liquid crystal layer 425 may be disposed between the first polarization film 421 and the second polarization film 423. According to an embodiment, the liquid crystal layer 425 may include a first liquid crystal 425-1 corresponding to the first polarization pattern and a second liquid crystal 425-2 corresponding to the second polarization pattern.

According to an embodiment, the first liquid crystal 425-1 and the second liquid crystal 425-2 may transmit the light without changing a polarization direction of the light in a turned-on state and may transmit the light after changing the polarization direction of the light by about 90° in a turned-off state. According to an embodiment, the first liquid crystal 425-1 and the second liquid crystal 425-2 may be turned on or off at different timings from each other. As an example, when the first liquid crystal 425-1 is turned on, the second liquid crystal may be turned off, and when the first liquid crystal 425-1 is turned off, the second liquid crystal 425-2 may be turned on.

FIG. 4C shows another example of a cross section taken along a line 40 crossing the polarization panel 410 shown in FIG. 4A. Referring to FIG. 4C, a polarization panel 420 may include a first polarization film 421, a second polarization film 423, a liquid crystal layer 427, and a third polarization film 429.

According to an embodiment, the first polarization film 421 and the second polarization film 423 may have the same or different polarization states. For example, the first polarization film 421 and the second polarization film 423 may transmit a light in a first polarization (e.g., about 90° linear polarization) state. As another example, the first polarization film 421 may transmit the light in the first polarization state and the second polarization film 423 may transmit a light in a second polarization (e.g., about 180° linear polarization) state.

According to an embodiment, the liquid crystal layer 427 may be disposed between the first polarization film 421 and the second polarization film 423. According to an embodiment, the liquid crystal layer 427 may transmit the light without changing a polarization direction of the light in a turned-on state and may transmit the light after changing the polarization direction of the light by about 90° in a turned-off state. Different from the liquid crystal layer 425 shown in FIG. 4B, an entire area of the liquid crystal layer 427 may be substantially simultaneously turned on or off.

According to an embodiment, the third polarization film 429 may be disposed between the first polarization film 421 and the liquid crystal layer 427 or between the liquid crystal layer 427 and the second polarization film 423. According to an embodiment, the third polarization film 429 may include a plurality of polarization patterns. The third polarization film 429 may be, for example, a patterned retarder. For example, the third polarization film 429 may include a first polarization pattern and a second polarization pattern alternately arranged with the first polarization pattern in a line unit. As another example, the third polarization film 429 may include a first polarization pattern and a second polarization pattern, which are arranged in a checkerboard pattern. The first polarization pattern may transmit, for example, a light in a first polarization (e.g., about 90° linear polarization) state, and the second polarization pattern may transmit a light in a second polarization (e.g., about 180° linear polarization) state.

According to an embodiment, the third polarization film 429 may include a polarization layer and a phase retardation layer. The polarization layer may include, for example, the plurality of polarization patterns, and may transmit a light in a specific polarization state depending on the polarization pattern. The phase retardation layer may delay, for example, a phase of a light, which is linearly-polarized, by about 45° to convert the polarization state of the light to a circularly-polarized light of about 135°.

Figure 5:
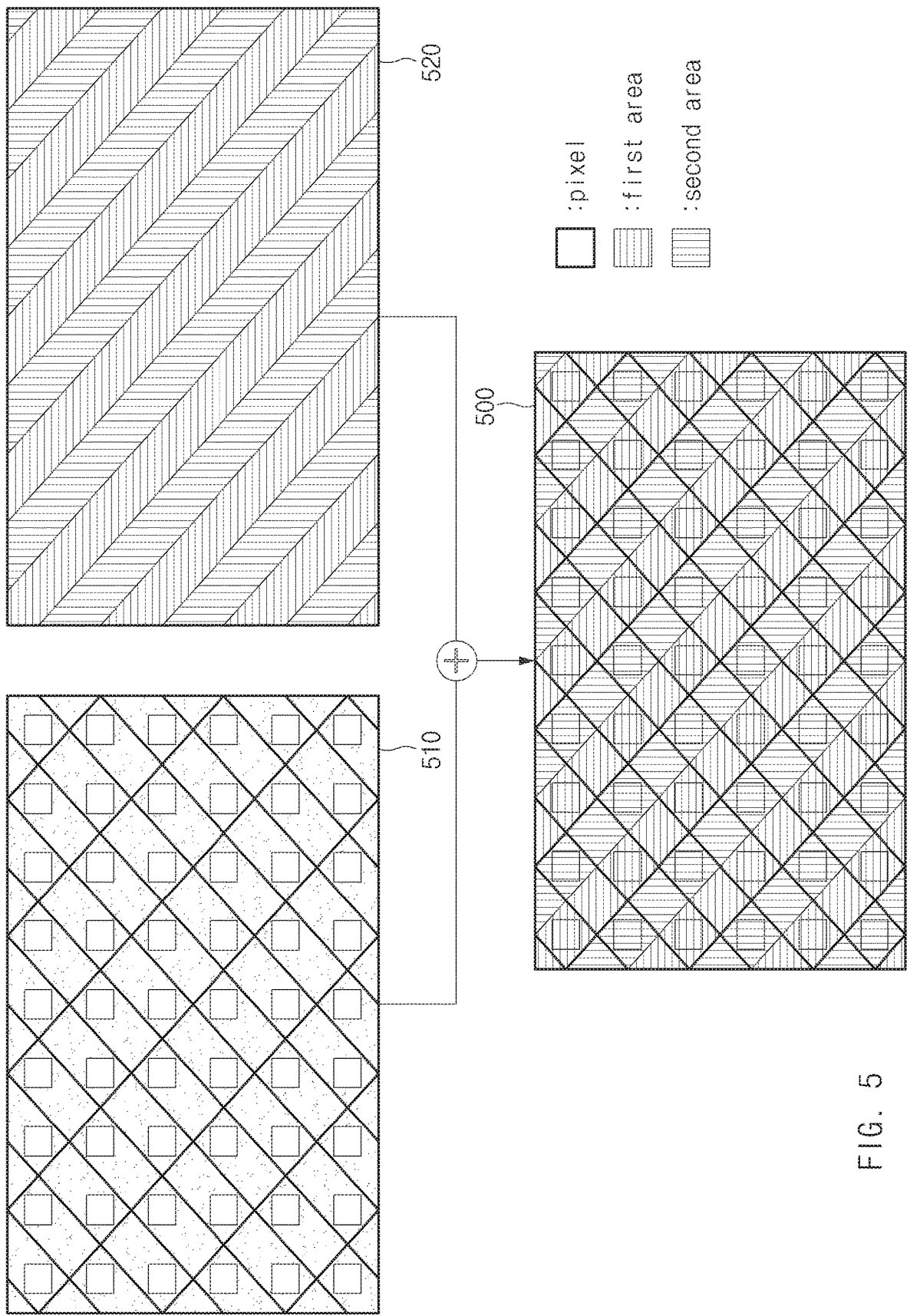
FIG. 5 is a view illustrating a structure of a panel device according to various embodiments of the disclosure.

FIG. 5 is a view illustrating a structure of a panel device according to various embodiments of the disclosure.

According to an embodiment, a panel device 500 may include a display panel 510 (e.g., the display panel 210 of FIG. 2A) and a polarization panel 520 (e.g., the polarization panel 420 of FIG. 4A). According to an embodiment, the polarization panel 520 may be disposed on the display panel to allow a boundary line between a first polarization pattern and a second polarization pattern to divide each of pixels included in the display panel 510 into a first area and a second area. As an example, the boundary line between the first polarization pattern and the second polarization pattern may bisect each of the pixels. The first area may be an area corresponding to the first polarization pattern, and the second area may be an area corresponding to the second polarization pattern. According to an embodiment, the pixels included in the display panel 510 may have a rectangular shape, and the first area and the second area may have a square shape.

According to an embodiment, some light sources among a plurality of light sources included in the display panel 510 may be disposed in the first area, and the other light sources among the light sources included in the display panel may be disposed in the second area.

Figure 6:
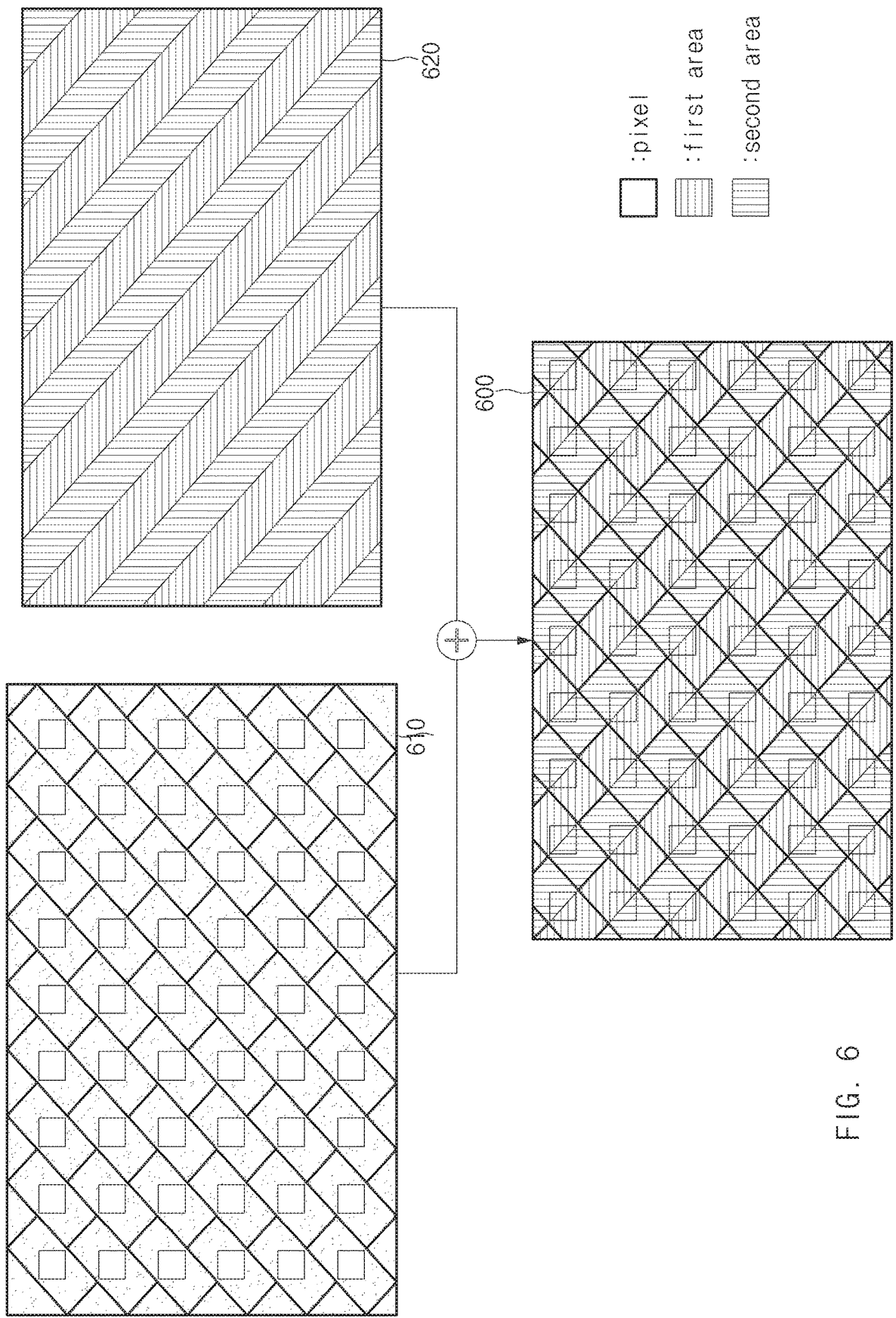
FIG. 6 is a view illustrating a structure of a panel device according to various embodiments of the disclosure.

FIG. 6 is a view illustrating a structure of a panel device according to various embodiments of the disclosure.

According to an embodiment, a panel device 600 may include a display panel 610 (e.g., the display panel 310 of FIG. 3A) and a polarization panel 620 (e.g., the polarization panel 420 of FIG. 4A). According to an embodiment, the polarization panel 620 may be disposed on the display panel to allow a boundary line between a first polarization pattern and a second polarization pattern to divide each of pixels included in the display panel 610 into a first area and a second area. As an example, the boundary line between the first polarization pattern and the second polarization pattern may bisect each of the pixels. The first area may be an area corresponding to the first polarization pattern, and the second area may be an area corresponding to the second polarization pattern. According to an embodiment, the pixels included in the display panel 610 may have a rectangular shape, and the first area and the second area may have a square shape.

According to an embodiment, a plurality of light sources included in the display panel 610 may be disposed over the first area the second area (for example, at a center area of the pixel) in the pixel.

Figure 7:
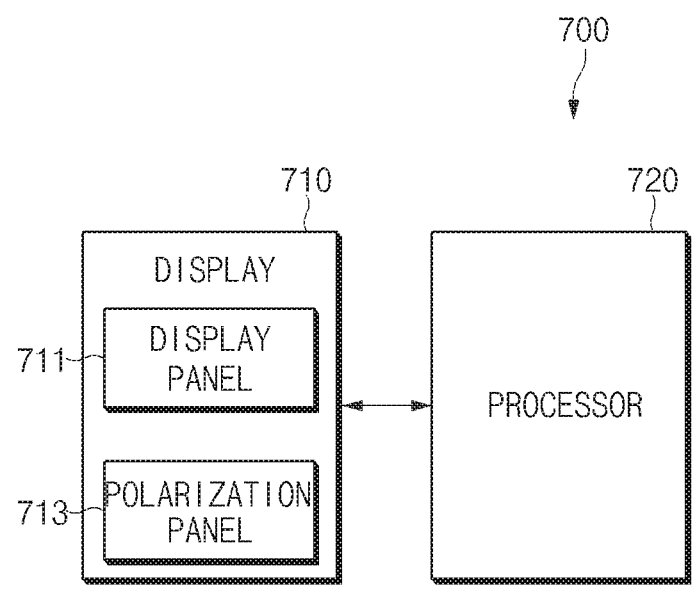
FIG. 7 is a block diagram illustrating a configuration of a display device according to various embodiments of the disclosure.

FIG. 7 is a block diagram illustrating a configuration of a display device according to various embodiments of the disclosure.

Referring to FIG. 7, a display device 700 may include a display 710 and a processor 720. The display device 700 shown in FIG. 7 may include not only a display device for home appliances, such as a television set, a monitor, etc., but also a large-sized display device, such as an electric signboard installed in a stadium or a screen installed in a movie theater.

According to an embodiment, the display 710 may include the panel device 100 shown in FIG. 1. According to an embodiment, the display 710 may include a display panel 711 and a polarization panel 713.

According to an embodiment, the processor 720 may control the display 710 to display an image through the display 710. According to an embodiment, the display device 700 may include at least one processor 720. For example, the display device 700 may include one processor 720 that controls the display panel 711 and the polarization panel 713. As another example, the display device 700 may include a plurality of processors 720 that respectively controls the display panel 711 and the polarization panel 713. According to an embodiment, the processor 720 may be implemented in a system-on-chip (SoC) including a central processing unit (CPU), a graphics processing unit (GPU), or a memory.

Figure 8:
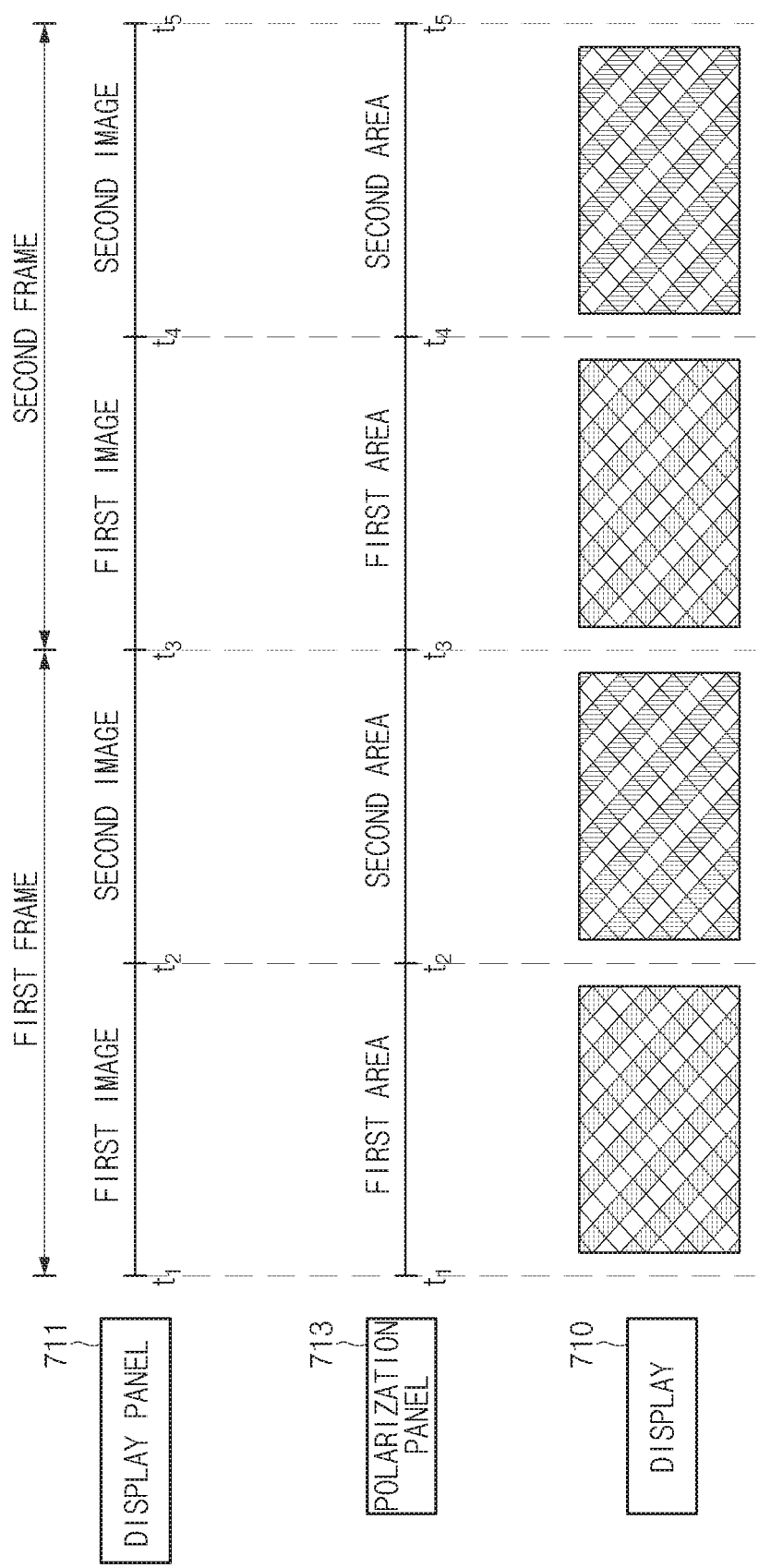
FIG. 8 is a view illustrating an image displayed through a display in accordance with a control of a processor of the disclosure.

FIG. 8 is a view illustrating an image displayed through a display in accordance with a control of a processor of the disclosure.

According to an embodiment, the processor 720 may alternately output a first image and a second image to the display panel 711 at a predetermined period. For example, the processor 720 may display the first image included in a first frame between a first time t1 and a second time t2, may display the second image included in the first frame between the second time t2 and a third time t3, may display the first image included in a second frame between the third time t3 and a fourth time t4, and may display the second image included in the second frame between the fourth time t4 and a fifth time t5. According to an embodiment, the first image may be an image corresponding to some pixels of the pixels included in an image frame, and the second image may be an image corresponding to the other pixels of the pixels included in the image frame. According to another embodiment, the first image may be a left eye image of the three-dimensional image, and the second image may be a right eye image of the three-dimensional image.

According to an embodiment, the processor 720 may control the polarization panel 713 such that the first image is displayed through the first area of the pixel and the second image is displayed through the second area of the pixel. As an example, in a case where the polarization panel 720 has the structure shown in FIG. 4B, the processor 720 may turn on (or turn off) a first liquid crystal (e.g., the first liquid crystal 425-1 of FIG. 4B) and may turn off (or turn on) a second liquid crystal (e.g., the second liquid crystal 425-2 of FIG. 4B) when the first image is output to the display panel 711. When the second image is output to the display panel 711, the processor 720 may turn off (or turn on) the first liquid crystal and may turn on (or turn off) the second liquid crystal. As another embodiment, in a case where the polarization panel 713 has the structure shown in FIG. 4C, the processor 720 may turn on (or turn off) a liquid crystal layer (e.g., the liquid crystal layer 427 of FIG. 4C) when the first image is output to the display panel 711 and may turn off (or turn on) the liquid crystal layer when the second image is output to the display panel 711.

Accordingly, the display 710 may display the first image included in the first frame through the first area of the pixel between the first time t1 and the second time t2, may display the second image included in the first frame through the second area of the pixel between the second time t2 and the third time t3, may display the first image included in the second frame through the first area of the pixel between the third time t3 and the fourth time t4, and may display the second image included in the second frame through the second area of the pixel between the fourth time t4 and the fifth time t5.

According to the above-described embodiment, since the first image and the second image are displayed respectively through the first area and the second area at different times, when a user views the display 710, each of the first area and the second area may be perceived by a user as an independent pixel. Therefore, one physical pixel may be perceived by the user as a plurality of pixels, and a resolution that user perceives may be increased.

Although the images having the same brightness are displayed, the brightness of the image displayed in the first area may be different from that of the image displayed in the second area depending on a position of the light sources in the pixel. For example, in a case where the light source is disposed in the first area, the brightness may be high when the image is displayed in the first area, and the brightness may be low when the image is displayed in the second area. According to an embodiment, when displaying the image through the area different from the area in which the light source is included, the processor 720 may increase the brightness of the image so as to reduce a difference in luminance depending on the position where the light source is disposed. For example, in a case where the display 710 includes the panel device 500 shown in FIG. 5, some light sources among the light sources may be disposed in the first area, and the other light sources among the light sources may be disposed in the second area. The processor 720 may increase the brightness of the image displayed through the pixel in which the light source is disposed in the second area when displaying the image through the first area and may increase the brightness of the image displayed through the pixel in which the light source is disposed in the first area when displaying the image through the second area.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A panel device comprising:
 a display panel comprising
  pixels,
  a base plate,
  a plurality of light sources disposed on the base plate, and
  a barrier disposed on the base plate and comprising sidewalls which are perpendicular to the base plate and spatially divide each of the plurality of light sources to form the pixels, respectively; and
 a polarization panel comprising a first polarization pattern and a second polarization pattern, and disposed on the display panel so that a boundary line between the first polarization pattern and the second polarization pattern divides each of the pixels into a first area corresponding to the first polarization pattern and a second area corresponding to the second polarization pattern,
 wherein the pixels comprise alternatively arranged first pixels and second pixels, and
 the plurality of light sources comprises:
  first light sources provided in the first area of each of the first pixels, respectively, wherein the second area of each of the first pixels does not have any of the plurality of light sources, and
  second light sources provided in the second area of each of the second pixels, respectively, wherein the first area of each of the second pixels does not have any of the plurality of light sources.

2. The panel device of claim 1, wherein the first polarization pattern and the second polarization pattern are alternately arranged in lines.

3. The panel device of claim 1. wherein each of the pixels has a rectangular shape, and each of the first area and the second area has a square shape.

4. The panel device of claim 1, wherein the polarization panel comprises:
 a first polarization film;
 a second polarization film;
 a liquid crystal layer disposed between the first polarization film and the second polarization film; and
 a third polarization film comprising the first polarization pattern and the second polarization pattern, and disposed between the liquid crystal layer and the first polarization film or between the liquid crystal layer and the second polarization film.

5. The panel device of claim 1. wherein the polarization panel comprises:
 a first polarization film;
 a second polarization film; and
 a liquid crystal layer disposed between the first polarization film and the second polarization film, and comprising a first liquid crystal corresponding to the first polarization pattern and a second liquid crystal corresponding to the second polarization pattern.

6. The panel device of claim 1, wherein the display panel further comprises:
 a first plurality of reflection plates disposed in the second area of each of the first pixels, respectively, and configured to reflect a light emitted from the first light sources disposed in the first area of the first pixels, a second plurality of reflection plates disposed in the first area of each of the second pixels, respectively, and configured to reflect a light emitted from the second light sources disposed in the second area of the, second pixels.

7. The panel device of claim 1, wherein the display panel further comprises:
 a diffuser disposed on the barrier to be substantially parallel to the base plate and configured to diffuse a light emitted from the plurality of light sources.

8. A display device comprising:
 a display; and
 a processor configured to display an image through the display, the display comprising:
  a display panel comprising:
   pixels,
   a base plate,
   a plurality of light sources disposed on the base plate, and
   a barrier disposed on the base plate and spatially divide each of the plurality of light sources to form the pixels, respectively; and
  a polarization panel comprising a first polarization pattern and a second polarization pattern, and disposed on the display panel so that a boundary line between the first polarization pattern and the second polarization pattern divides each of the pixels into a first area and a second area,
  wherein the pixels comprise first and second pixels different from the first pixels, and
  the plurality of light sources comprises:
   first light sources provided in the first area of each of the first pixels, respectively, wherein the second area of each of the first pixels does not have any of the plurality of light sources, and
   second light sources provided in the second area of the second pixels, respectively, wherein the first area of each of the second pixels does not have any of the plurality of light sources.

9. The display device of claim 8, wherein the processor is further configured to:
 alternately output a first image and a second image to the display panel at a predetermined period; and control the polarization panel such that the first image is displayed through the first area and the second image is displayed through the second area.

10. The display device of claim 9, wherein the polarization panel further comprises:
   a first polarization film;
   a second polarization film;
   a liquid crystal layer disposed between the first polarization film and the second polarization film; and
   a third polarization film comprising the first polarization pattern and the second polarization pattern, and disposed between the first polarization film and the liquid crystal layer or between the liquid crystal layer and the second polarization film,
   wherein, the processor is further configured to:
      turn on the liquid crystal layer when the first image is output, and
      turn off the liquid crystal layer when the second image is output.

11. A display device comprising:
   a display comprising:
      a display panel comprising pixels, and
      a polarization panel comprising a first polarization pattern and a second polarization pattern, and disposed on the display panel so that a boundary line between the first polarization pattern and the second polarization pattern divides each of the pixels into a first area and a second area; and
   alternately output a first image and a second image to the display panel at a predetermined period, and
   control the polarization panel such that the first image is displayed through the first area and the second image is displayed through the second area,
   wherein the polarization panel further comprises:
      a first polarization film;
      a second polarization film; and
      a liquid crystal layer disposed between the first polarization film and the second polarization film, and comprising a first liquid crystal corresponding to the first polarization pattern and a second liquid crystal corresponding to the second polarization pattern, and
   wherein the processor is further configured to:
      turn on the first liquid crystal and turn off the second liquid crystal when the first image is output; and
      turn off the first liquid crystal and turn on the second liquid crystal when the second image is output.

* * * * *